United States Patent

Hahlganss

[11] Patent Number: 5,471,389
[45] Date of Patent: Nov. 28, 1995

[54] SELECTIVE CONTROL OF DEVICES IN A MOTOR VEHICLE

[75] Inventor: Günter Hahlganss, Kriftel, Germany

[73] Assignee: VDO Adolf Schindling AG, Frankfurt am Main, Germany

[21] Appl. No.: 10,601

[22] Filed: Jan. 28, 1993

[30] Foreign Application Priority Data

Feb. 19, 1992 [DE] Germany .......................... 42 04 996.2

[51] Int. Cl.$^6$ ..................................................... B60N 3/00
[52] U.S. Cl. ..................................... 364/424.05; 341/176
[58] Field of Search ............................. 180/167, 169; 341/176; 307/10.1, 10.4, 10 R; 364/424.05, 424; 455/88, 90, 158.4; 369/6

[56] References Cited

U.S. PATENT DOCUMENTS

| | | | |
|---|---|---|---|
| 4,291,411 | 9/1981 | Müller et al. | 455/88 |
| 4,348,726 | 9/1982 | Igarashi et al. | 364/424 |
| 4,371,934 | 2/1983 | Wahl et al. | 364/424 |
| 4,435,648 | 3/1984 | Goode, III | 307/10 R |
| 4,731,769 | 3/1988 | Schaefer et al. | 369/6 |
| 4,893,240 | 1/1990 | Karkouti | 364/424.05 |
| 5,086,510 | 2/1992 | Guenther et al. | 455/90 |
| 5,239,700 | 8/1993 | Guenther et al. | 455/158.4 |

*Primary Examiner*—Kevin J. Teska
*Assistant Examiner*—Russell W. Frejd
*Attorney, Agent, or Firm*—Martin A. Farber

[57] ABSTRACT

In an arrangement for the control of a device in a motor vehicle, in which control information is transmitted to the device by a control unit, the control unit is portable and may be passed about among passengers and a driver of the vehicle. When the vehicle is underway, the device is rendered non-responsive to the control information. This is accomplished at least partially blocking transmission of the control information to the device when the control unit is within reach of the driver.

12 Claims, 2 Drawing Sheets

SELECTIVE CONTROL OF DEVICES IN A MOTOR VEHICLE

FIELD AND BACKGROUND OF THE INVENTION

The present invention relates to an arrangement for the control of a device in a motor vehicle, control information being transmitted to the device by a control unit.

With the increasing complexity of equipment installed in a motor vehicle, such as, for instance, communication equipment, navigation equipment or so-called on-board computers, the use of movable keypads in motor vehicles may be advantageous in order to achieve the greatest possible convenience of control. This can, however, impair safety in traffic by diverting the attention of the driver, for instance, because of his searching for a control unit present within the vehicle or his carrying out a control which requires a large part of his attention.

SUMMARY OF THE INVENTION

It is an object of the present invention substantially to exclude such sources of danger.

According to the invention, the control unit (2, 21) is movable and, when the vehicle is underway, action of the control information is at least partially blocked when the control unit (2, 21) is within reach of the driver.

By the arrangement in accordance with the invention, the driver of a motor vehicle is forced to leave at least more complicated control operations to passengers or to effect them only when the vehicle is stopped. The arrangement in accordance with the invention does not, in principle, prevent selected control functions from nevertheless being carried out by the driver. Within the scope of the invention this can also be done with additional control means which are arranged fixed in position within the reach of the driver. Thus, it may be advantageous, for instance, to set a transmitter which transmits traffic information for the location of the vehicle at the time by depressing a key within the reach of the driver, while more complicated control processes such as, for instance, the control of a cassette drive in the automobile radio in order to record broadcasts received are possible only by the passengers or when the vehicle is at a standstill.

A further development of the invention provides that a transmission of signals which represent the control information are transmitted between the control unit (2) and the device (1) by cable (3) and that a wireless transmission path (11, 6; 11, 16) is provided between the control unit (2) and one or more fixed points within the motor vehicle, the control unit transmitting signals which block or release the action of the control information depending on the location of the control unit at that time.

This further development takes into consideration the fact that it may be advantageous to transmit the control information by cable within the passenger space of a motor vehicle, while at the same time it provides the advantages of the arrangement in accordance with the invention. Transmission of the control information by cable can, for instance, be advantageous for reasons of freedom from interference. Furthermore, the supplying of the control unit with energy can then also take place via the cable.

In this further development, it is advantageously provided that the wireless transmission path (11, 6; 11, 16) operate with infrared rays. In this way, good local selectivity is possible.

Another further development of the invention provides that the transmission of the control information between the control unit (21) and the device (1) takes place in wireless manner, at least one receiver (23) being so developed that reception of the control information is not possible from the direction of the driver. In order to create a suitable reception region, several receivers can possibly be distributed throughout the passenger space. In accordance with one advantageous embodiment of this further development another receiver (24) is provided to receive information from the direction of the driver.

Another further development of the invention is characterized by the fact that the transmission of control information between the control unit (21) and the device takes place in wireless manner, at least one first receiver (31) being so developed that reception of the control information is possible from all parts of the passenger space, that a second receiver (33) is directed to the region of the driver, and that, upon reception of control information by the second receiver (33), the action of the control information is blocked. This further development has the particular advantage that the receivers can be provided with a simpler directional characteristic.

Also in the other further developments indicated, it is advantageous for the control information to be transmitted by means of infrared rays. Furthermore, the arrangement of the invention can also be developed in such a manner that additional information can be transmitted from the device to the control unit. In this way, information from the device can be shown, for instance, on a display arrangement in the control unit.

Further, the invention provides the feature that intended control information is possible from the place of the driver also when the vehicle is underway.

According to another feature of the invention, control elements for the intended control information are arranged, fixed in position, in the vicinity of the driver.

One advantageous embodiment of the invention furthermore provides that one or more receivers are arranged in the region of the upper edge of the windshield. In this case the receivers can be integrated in an assembly which also bears a rear-view mirror.

The invention permits numerous embodiments.

BRIEF DESCRIPTION OF THE DRAWINGS

With the above and other objects and advantages in view, the present invention will become more clearly understood in connection with the detailed description of the preferred embodiments, when considered with the accompanying drawings, of which.

DETAILED DESCRIPTION OF THE PREFERRED EMBODIMENTS

Identical parts bear the same reference numbers in the figures. Furthermore, the seats in an ordinary passenger car are indicated by F=driver and M=passenger within the schematically shown reception areas of the infrared receivers.

Figure 1:
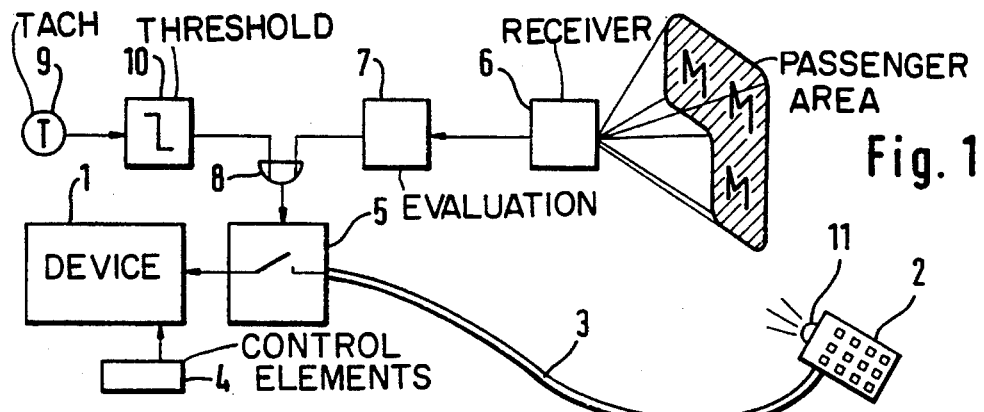
FIG. 1 is a block diagram of a first embodiment.

In the arrangement in accordance with FIG. 1, a device 1 can be controlled via a cable 3 by means of a control unit 2. Furthermore, other control elements 4 are connected to the device 1, they being arranged either directly on the device 1 or at a place accessible to the driver within the motor vehicle. The transmission of control information from the control unit 2 to the device 1 can be interrupted by means of a controllable switch means 5. This means can also be located in the device.

An infrared receiver 6 having a reception characteristic which permits reception of infrared rays from the passenger seats is connected, via an evaluation circuit 7, to a first input of an OR-circuit 8. A signal proportional to the speed is produced by a tachometer 9 and conducted, via a threshold circuit 10, to a second input of the OR-circuit 8 in such a manner that the level "0" is present at the second input of the OR- circuit 8 when the speed exceeds a threshold value of, for instance, 5 km/hr. The evaluation circuit 7 produces the level "1" when the infrared radiation coming from an infrared transmitter 11 on the control unit 2 is received by the receiver 6.

In this way, the switch means 5 is controlled in such a manner that the control information is forwarded to the device 1 only when the vehicle is stopped or is traveling very slowly or when the control unit 2 is within the reception area of the infrared receiver 6, i.e. at the passenger seats.

Figure 2:
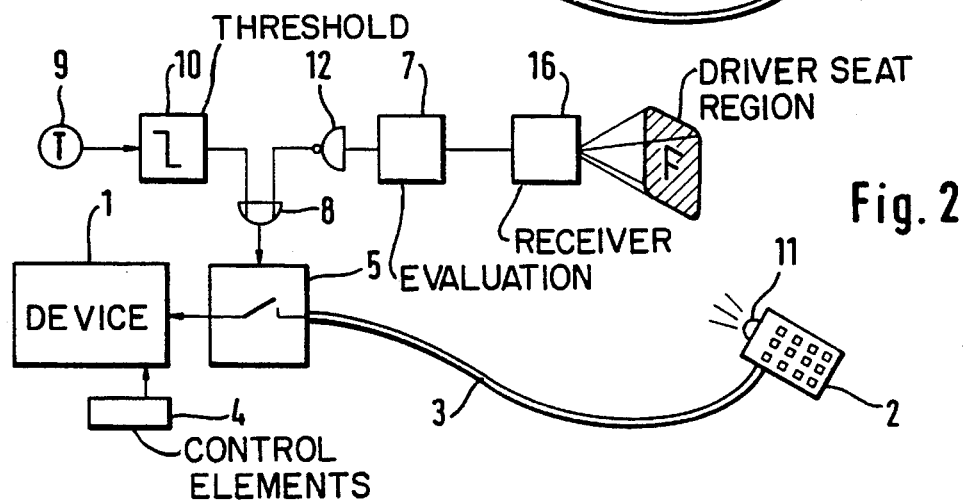
FIG. 2 shows a second embodiment, in which the control information is transmitted over cable.

The arrangement according to FIG. 2 is to the greatest part identical to that of FIG. 1. The infrared receiver 16, however, is directed towards the driver's seat. In order to prevent the control information from reaching the device 1 when the control unit 2 is in the vicinity of the driver, the output signal of the evaluation circuit 7 is therefore inverted at 12 before being fed to the OR-circuit 8.

Figure 3:
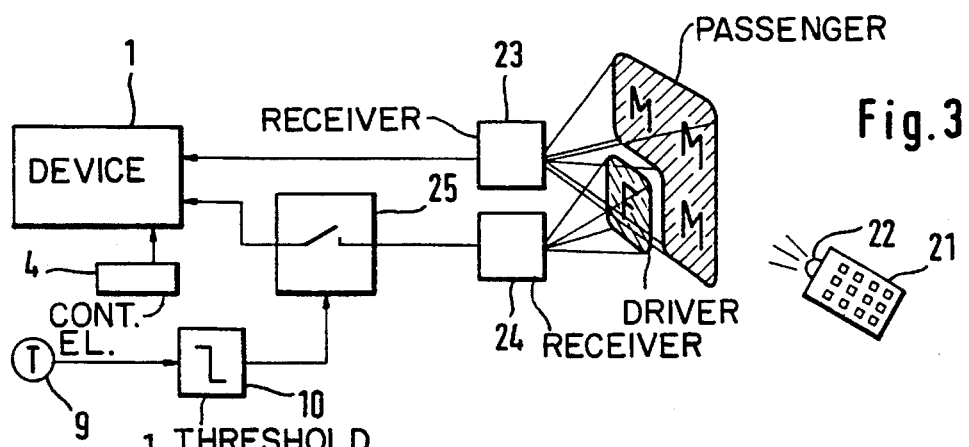
FIG. 3 shows an embodiment with infrared transmission of the control information.

In the embodiment shown in FIG. 3, the transmission of the control information from a control unit 21 takes place via an infrared transmitter 22 to an infrared receiver 23 the reception region of which covers the passenger seats. The control information received by the infrared receiver 23 is fed to the device 1. Another infrared receiver 24 is directed towards the driver's seat. The control information received by him is forwarded via a switch means 25 only when the vehicle is at a standstill or is traveling very slowly.

Figure 4:
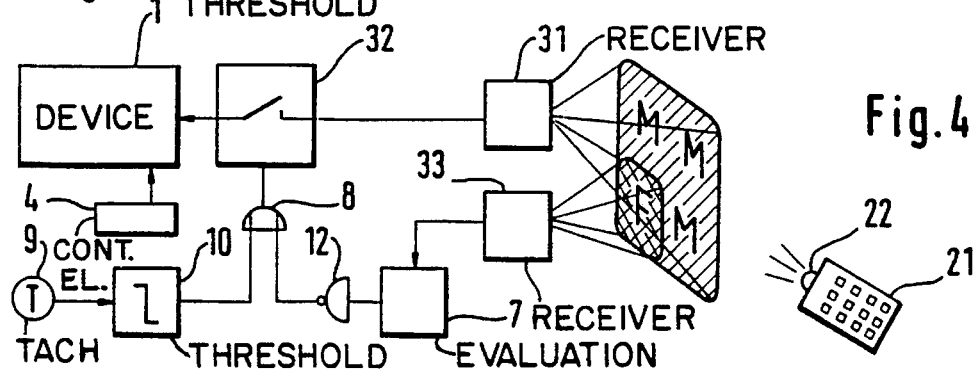
FIG. 4 is a further embodiment with infrared transmission of the control information.

As compared with the embodiment of FIG. 3, in the embodiment of FIG. 4 the control information is received by an infrared receiver 31 the reception region of which extends over the entire passenger space. Signals which contain the control information received are, in the embodiment of FIG. 4, conducted to the device 1 over controllable switch means 32.

By means of another infrared receiver 33, which is directed at the driver's seat, the switch means 32 is so controlled that the signals from the receiver 31 are forwarded to the device 1 only when the receiver 33 does not receive any infrared radiation from the infrared transmitter 22 or when the vehicle is at a standstill or traveling very slowly. For this purpose, the output of the infrared receiver 33 is connected, via an evaluation circuit 7 and an inverter 12, to an input of an OR-circuit 8, while a tachometer 9 controls the other input of the OR-circuit via a threshold circuit 10.

Figure 5:
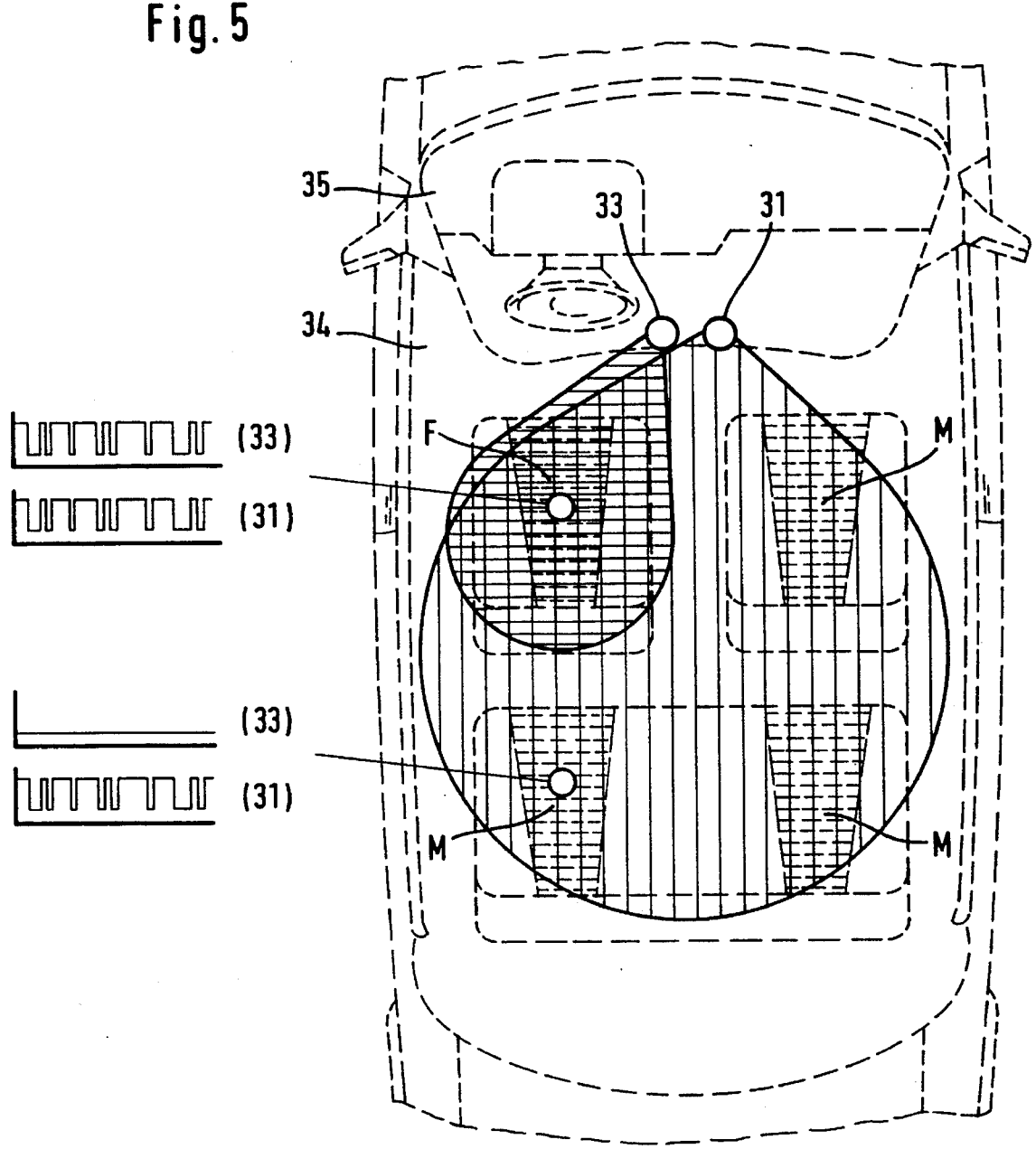
FIG. 5 shows the passenger space of a motor vehicle with two infrared sensors and their directional characteristic.

In FIG. 5, parts of a motor vehicle, in particular of the passenger space 34, are showed in dash line. The driver's seat F and passenger seats M are located therein. At the upper edge of the windshield 35 there are infrared receivers 31, 33 the reception areas of which are indicated by different hatchings. An infrared signal coming from the driver's seat F and bearing control information is received by both sensors 31, 33, as is indicated by the diagrammatic showing of digital signals alongside the driver's seat. An infrared signal coming from one of the passenger seats M is, however, received only by the receiver 31. The evaluation of this difference is effected, for instance, with the arrangement shown in FIG. 4.

I claim:

1. A system for controlling a device in a motor vehicle, wherein control information is transmitted to the device by a control unit, the system comprising a control unit located in the vehicle for control of the device by transmission of control information to the device;

a signal transmission path extending to said device for transmission of the control information;

means disposed in said signal transmission path for blocking said transmission of control information;

wherein said control unit is movable and, during a travelling of the vehicle, action of the control information is at least partially blocked by said blocking means upon a positioning of said control unit adjacent the driver.

2. A system according to claim 1, wherein said signal transmission path comprises a cable transmission path and a wireless transmission path, said cable transmission path extending at least partway between said control unit and said device;

wherein a transmission of signals which represent the control information are transmitted between the control unit and the device by said cable; and said wireless transmission path extends between the control unit and one or more fixed points within the motor vehicle, said blocking means being responsive to signals transmitted via the wireless transmission path to block or to release action of the control information based upon present position of said control unit within said vehicle.

3. A system according to claim 2, wherein said wireless transmission path operates with infrared rays.

4. A system according to claim 1, wherein said blocking means transmits intended control information from the place of the driver dependent on vehicular speed during a movement of the vehicle.

5. A system according to claim 4, further comprising control elements for the intended control information, the control elements being fixed in position, in the vicinity of the driver.

6. A system for controlling a device in a motor vehicle, wherein control information is transmitted to the device by a control unit, the system comprising a control unit located in the vehicle for control of the device by transmission of control information to the device;

means for blocking said transmission of control information;

wherein said control unit is movable and, during a travelling of the vehicle, action of the control information is at least partially blocked by said blocking means upon a positioning of said control unit adjacent the driver;

the system further comprises at least one receiver; and wherein the transmission of the control information between said control unit and said device takes place in wireless manner, said at least one receiver being directed away from a location of the driver to prevent reception of the control information from the direction of the driver.

7. A system according to claim 6, further comprising a second receiver directed toward the location of the driver to receive information from the direction of the driver.

8. A system according to claim 6, wherein said at least one receiver is positioned in the region of the upper edge of the windshield.

9. A system according to claim 8, wherein said at least one receiver is integrated in an assembly which also bears a rear-view mirror.

10. A system for controlling a device in a motor vehicle, wherein control information is transmitted to the device by a control unit, the system comprising a control unit located in the vehicle for control of the device by transmission of control information to the device;

means for blocking said transmission of control information;

wherein said control unit is movable and, during a travelling of the vehicle, action of the control information is at least partially blocked by said blocking means upon a positioning of said control unit adjacent the driver;

the system further comprises a first and a second receiver;

wherein the transmission of control information between said control unit and said device takes place in wireless manner, said first receiver being directed to a passenger location of said vehicle to enable reception of the control information from all parts of the passenger space of the vehicle;

said second receiver is directed to a region of the driver; and said blocking means is operative, upon reception of control information by said second receiver, to block action of the control information.

11. A system according to claim 10, wherein the control information is transmitted by means of infrared rays.

12. A system according to claim 11, wherein further information, in addition to the control information, can be transmitted from said device to said control unit via at least one of said transmission paths.

* * * * *